Figure 1:
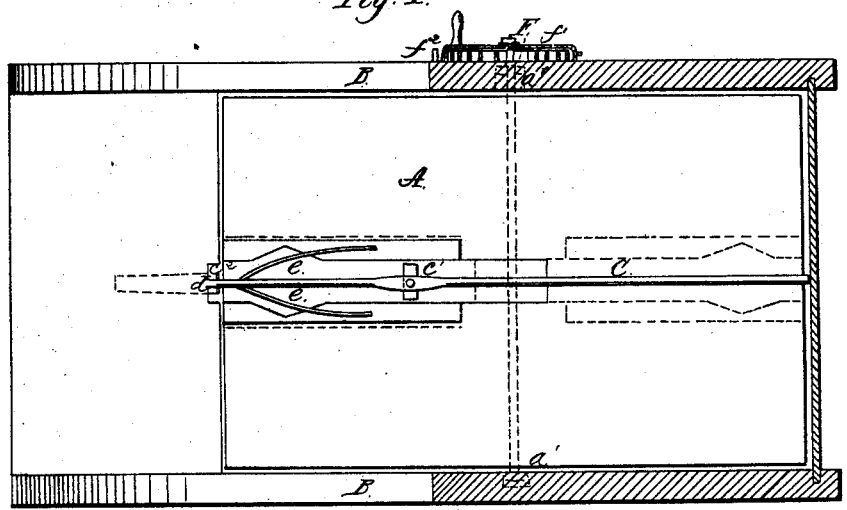
Figure 2:
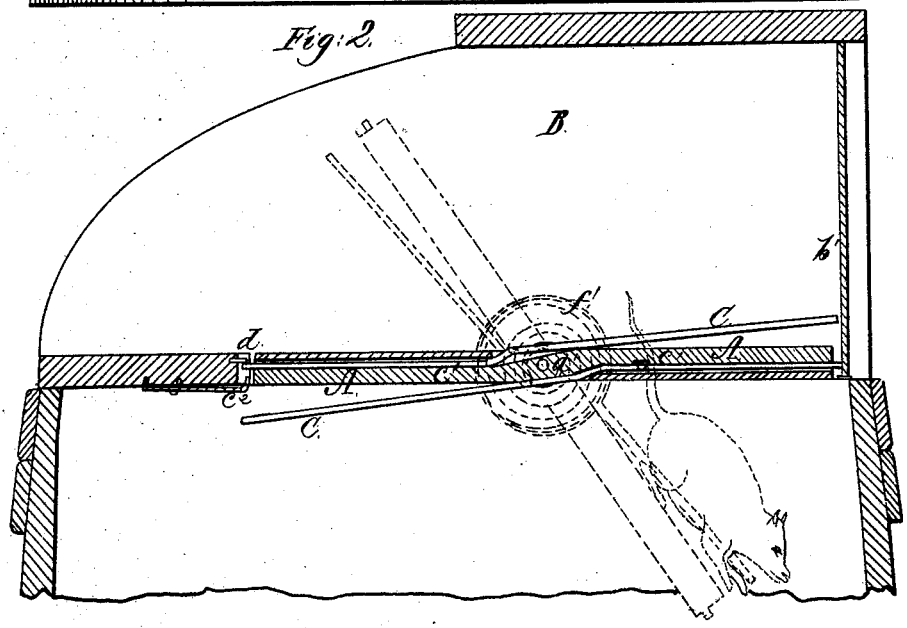

T. S. Phillips,

Cage Trap,

N° 69,583. Patented Oct. 8, 1867.

Witnesses:
B. H. Muehle
Henry Klerkes

Inventor:
T. Sawyer Phillips,
By E. B. & W. H. Forbush Attys

United States Patent Office.

T. SAWYER PHILLIPS, OF CASADAGA, ASSIGNOR TO HIMSELF AND M. J. BELLOWS, OF DUNKIRK, NEW YORK.

*Letters Patent No. 69,583, dated October 8, 1867.*

IMPROVEMENT IN ANIMAL TRAPS.

*The Schedule referred to in these Letters Patent and making part of the same.*

TO ALL WHOM IT MAY CONCERN:

Be it known that I, T. SAWYER PHILLIPS, of Casadaga, Chautauqua county, and State of New York, have invented a new and improved Animal Trap; and I do hereby declare that the following is a full and exact description thereof, reference being had to the accompanying drawings, making a part of this specification, in which—

Figure I is a top plan view.

Figure II is a longitudinal section.

The nature of this invention consists in the construction of an animal trap having a table or platform revolving upon a central axis, and provided with a latch and bait-bar at each end, and a spring and catch arranged therewith in such manner that as an animal, (rats, mice, or other animals,) passes over the table and seizes the bait he will thereby unfasten the latch-bar and permit the table (by the action of the spring and the weight of the animal) to make a quick half revolution, throwing the animal into a tight box below, and setting itself for another animal, and so on.

Letters of like name and kind refer to like parts in each of the figures.

A represents a platform, which is hinged in the centre in a manner to divide the platform into two equal parts. It is supported in bearings $a'$ formed in the bottom of an oblong case, B, which is open at one end, and has a glass cover, $b'$, at the other, the platform constituting a portion of the bottom of the case. C represents a latch-bar, which extends longitudinally from the glass cover $b'$ to the opposite end of the platform, and is hinged as shown at $c^1$. One-half of it is located above the platform and holds the bait, and the other half is placed within a recess cut in the platform, and projects from the end thereof sufficiently to engage with the spring-catch $c^2$ and stop-pin $d$, attached to the solid portion of the bottom of the case. Within the recess above mentioned two flat springs $e\ e$, fastened to the platform, and pressing one upon each side of the latch-bar C, retain the same in a position in line with the stop-pin $d$, with sufficient play to allow a slight movement of the latch-bar to either side, for the purpose of releasing or unlatching the platform. A latch-bar of similar construction is placed in the same manner upon the under side of the platform, which, when the same makes one-half revolution, takes the place of the former upon the top thereof. F represents a coil spring, enclosed within a case, $f^1$, one end of which spring is attached to the shaft or bearing $a'$, and the other to the inside of the case $f^1$. The spring case is provided with a projection upon its circumference, so that when the spring is wound up it may be retained in that position by the pin $f^2$.

The operation of my improved trap is as follows: A bait being firmly attached to the projecting free end of the latch-bar C, near the glass end of the case, the spring F is wound up and secured by the pin $f^2$, and the trap placed upon an opening in the head of a barrel, or in a box or other receptacle, in such manner that the platform A may freely revolve within said opening. The trap being thus set, it will permit animals to approach it, walk over the platform and around the bait without interfering with the mechanism of the trap, but as soon as they begin to nibble at the bait and pull the same, and with it the latch-bar, sidewise, its other end will slip from under the stop-pin $d$, thereby releasing or unlatching the platform, which will then by means of the spring F be forced to revolve upon its axis in a manner to withdraw the end nearest the glass from under the animals feet and precipitate them into the receptacle below. The platform, after having made one-half revolution around its axis, will again be locked by means of the second latch-bar, which passes the spring-catch $c^1$, and is arrested by the stop-pin $d$. Another bait having been fastened to this latch-bar, it will operate in the same manner. If the bait is securely attached to the latch-bars it will last a long time, and will entrap a great number of animals before it is used up.

What I claim as my invention, and desire to secure by Letters Patent, is—

An animal trap, having a revolving table, A, provided with catch and bait-bars C at each end and upon opposite sides thereof, coil spring F, spring-catch $c^2$, and stop-pin $d$, constructed and operating substantially as herein described.

T. SAWYER PHILLIPS.

Witnesses:
W. STACY HATCH,
A. P. PHILLIPS.